Feb. 7, 1956 J. D. STAPLES ET AL 2,733,511
MEASURING WHEEL
Filed Sept. 6, 1951
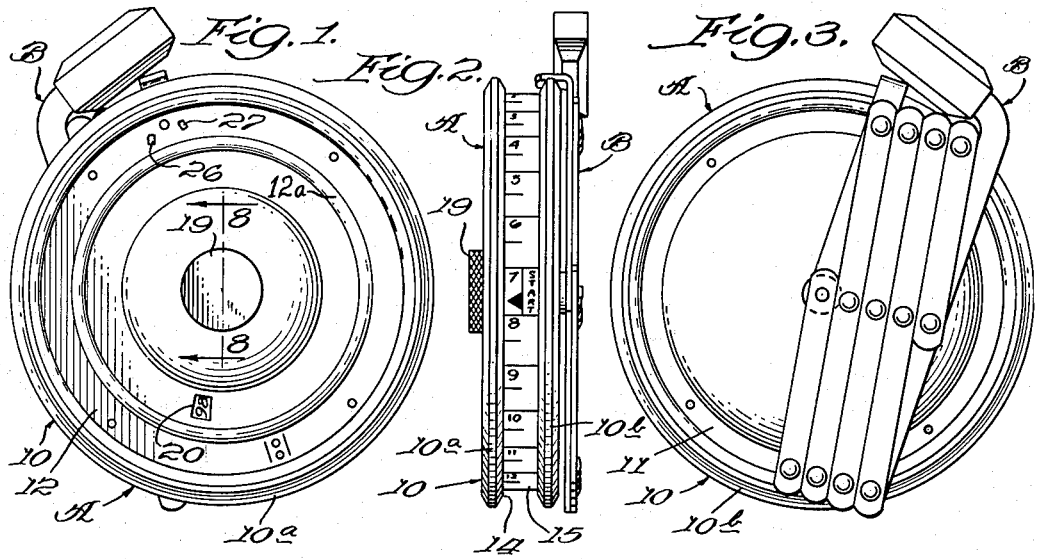
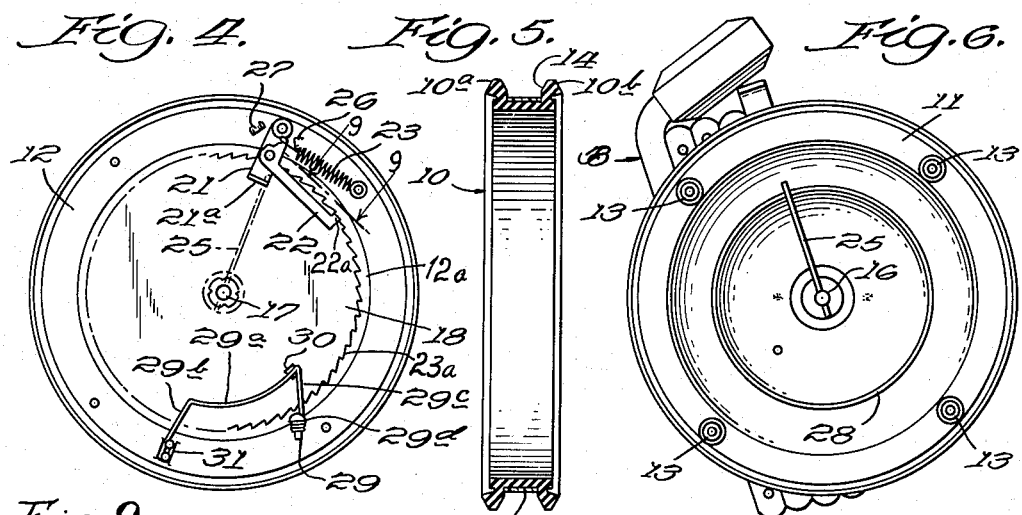
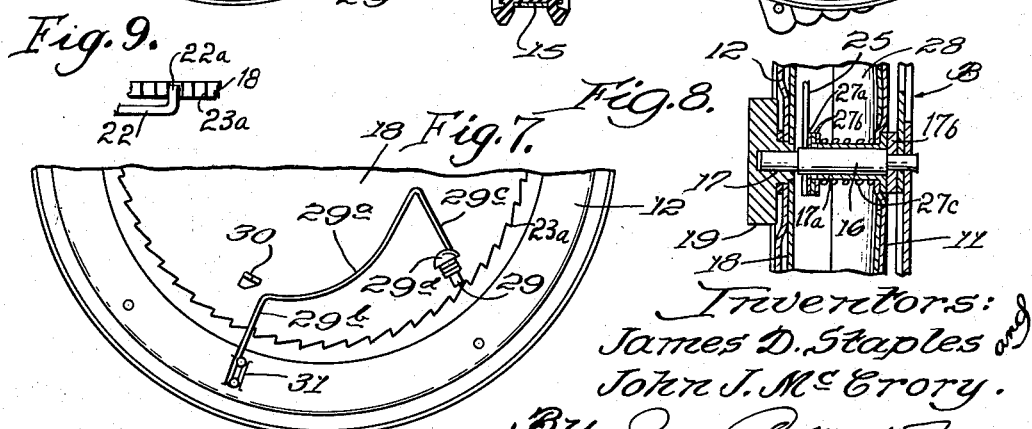
Inventors:
James D. Staples and
John J. McCrory.

United States Patent Office 2,733,511
Patented Feb. 7, 1956

2,733,511

MEASURING WHEEL

James D. Staples, Bell, and John J. McCrory, South Pasadena, Calif., assignors to Rolatape, Inc., Santa Monica, Calif., a corporation of California Application September 6, 1951, Serial No. 245,376

5 Claims. (Cl. 33—141)

The hereinafter described invention relates to improvements in measuring wheels of the character which are propelled over a surface to be measured and to indicate the lineal distance traveled.

This invention incorporates certain new features, advantages and results additional to the improvements as covered by our United States Letters Patent No. 2,557,481 of June 19, 1951.

The objects of the present improvements include the following:

1. The provision of a measuring wheel having means located within the confines of the wheel housing which will not only audibly signal the linear distance traversed per revolution of the wheel, but in addition thereto will signal to the operator a predetermined longer distance than the distance of a single revolution—the signaling means being such as to produce distinguishable tones between the single revolution measurements and the longer traversed distances and aiding the wheel operator in keeping count of the longer running measurements without having to count the signals of single revolution measurements and thus accomplishing a material saving in manhours by virtue of the increased expeditition of the measuring operation.

2. The provision of a measuring wheel having an audible signaling means by which a specified distance may be covered beyond the distance of a single revolution of the wheel and giving to an instrument of the character the ability to run off distances by signal alone and thereby making available to the operator a simple, efficient and quick means of measuring relatively long distances and areas of considerable extent, the advantage of the improvements being exemplified at least by one example namely, in orchard planting where tree rows with definite uniform distances between trees can be expeditiously tolled off by signal without resort to observation of the revolution-counting and indicating mechanism of the device.

3. The provision of a measuring wheel incorporating a plurality of audible signals each of which is readily distinguishable from the other by tone and which serve as a check on the revolution-counting and indicating mechanism of the instrument and giving to the operator another means of carrying on the measurement of the terrain should the revolution-counting and indicating mechanism of the instrument become inoperative for any reason.

4. The provision of audible signals in a measuring wheel where short run measurements can be accounted for by the signaling of single revolutions of the wheel and long run measurements can be kept track of by periodical signals rendering unnecessary frequent observations of the window of the revolution counter of the instrument, this advantage being particularly noteworthy and advantageous during the taking of measurements under adverse weather conditions such as rain and sleet and particularly where long run measurements are to be made under such conditions.

5. The provision of a measuring wheel which by the improved structural incasement of the revolution-counting and indicating mechanism as well as the measurement indicia is rendered capable of withstanding usage over rough terrain and under weather conditions beyond that now possible in measuring wheels of the character—the incasement including a resilient cylindrical ring the outer peripheral face of which comprises the wheel tread and the measurement indicia being centrally depressed in the wheel tread so that the sides of the tread protect it from defacement in the traverse of the wheel over the surface to be measured and the incasement structure being completed by a pair of relatively flat discs drawn into joint engagement against the end surfaces of the cylindrical ring so as to form a tight chamber for the revolution-counting and indicating mechanism and the audible signal means which are carried on the inner faces of the incasement discs.

6. The provision of a simplified measuring wheel instrument possessing extended utility in which a tire made of rubber, neoprene or other resilient material is used as the cylindrical shell of the housing and a pair of relatively flat circular discs compressed to a joint against the end margins of the tire serve as the sides of the housing, the discs carrying revolution-counting and indicating mechanism and audible signal means on their inner faces and the tread of the tire visibly incasing and protecting the measurement indicia which is depressed centrally in its face; this arrangement has the advantage of protecting the more delicate portions of the instrument and in a housing which is substantially entirely weather proof and resistant to jar and vibration, particularly when the instrument is subjected to the taking of linear measurements in rough terrain and where adverse weather conditions and moisture obtain.

As aforesaid the purpose of the present invention is to set out those improvements in a measuring wheel which extend additionally to the improvements of our invention as covered by United States Letters Patent No. 2,557,481.

Referring to the drawings:

Fig. 1 is an elevational view showing one of the sides of a measuring wheel instrument embodying the present invention, the wheel being in rolling position.

Fig. 2 is an elevational view of the instrument looking into the wheel tread and showing the measurement indicia as situated in the depressed portion of the wheel tread, the wheel being in rolling position as in Fig. 1.

Fig. 3 is an elevational view similar to Fig. 1 showing the handle side of the instrument opposite the wheel side shown in Fig. 1.

Figs. 4, 5 and 6 are elevational views showing the three members comprising the housing of the wheel unit disassembled, Fig. 5 showing sectionally the hollow cylindrical member which forms the tire of the wheel unit, while Fig. 4 shows one of the pair of side plates of the wheel housing and presenting the inner face thereof, and Fig. 6 showing the other wheel housing plate and presenting the inner face of same.

Fig. 7 is an enlarged fragmentary view showing a portion of the inner face of the wheel housing plate of Fig. 4, and more particularly illustrating the spring actuated hammer by which the bell, as carried by the housing plate of Fig. 6 is struck in tolling the longer distance measurements of the instrument.

Fig. 8 is a fragmentary view of a center portion of the wheel housing of the instrument showing the axle upon which the wheel is mounted to rotate and the relation of the axle and side plates of the wheel housing.

Fig. 9 is a fragmentary view taken on the line 9—9 of Fig. 4 showing the teeth of the ratchet disc and the pawl member engaged therein.

In the illustrative embodiments covering the improvements of the invention A denotes the wheel member of the instrument, and B the handle by which the wheel is propelled over the surface to be measured, the handle being shown in folded position against one side of the wheel member A. The wheel member A comprises a cylindrical housing portion formed by the tire 10, preferably made of rubber, neoprene or other resilient material, and two circular disc plates 11 and 12 between which the tire is mounted, plate 12 being strengthened by a circularly arranged corrugation 12a. As shown the margins of the plates 11 and 12 are adapted to seat in recesses formed in the side margins of the tire 10—the plates being drawn into joint engagement with the side margins of the tire by the pillar studs 13. The face of the tire 10 is centrally recessed with an annular groove 14 into the bottom of which a tape 15 depicting the measurement indicia or scale is firmly set, the resilient margins of the tire visibly encasing the measurement tape well below the tire tread and the tread being split into the two peripheral portions 10a and 10b so as to straddle the measurement tape 15.

The wheel member A rotates on an axle 16. The axle 16 extends through the axis of the housing portion 10 and is journaled at one end in a bearing 17 and at its other end in a bushing 17a. The bearing 17 has fixed to the outer circumference thereof a ratchet disc 18, and the plate 12 is rotatably received by the bearing 17 adjacent the outer face of the ratchet disc 18. The bearing 17 extends through the plate 12 and carries adjacent its end a turning knob 19 by which the operator is able to turn ratchet disc 18 relative to plate 12 as will be more fully appreciated hereinafter.

The plate 11 is fixed to the bushing 17a so that the plates 11 and 12 are rotatable about the axis of the axle 16 in unison. A washer 17b is received by axle 16 adjacent bushing 17a and the handle B is suitably fixed on the end of the axle adjacent washer 17b.

The face of the ratchet disc 18 opposing the inner face of the plate 12 is emblazoned with the revolution-counting and recording figures of the instrument, which run from 0 to 98 inclusive in multiples of two and are visible to the operator through the window 20 in plate 12. Resetting of the revolution-counting and recording figures is effected by the turning knob 19.

Plate 12 also carries on its inner surface the means for moving the ratchet disc 18 in unison with plates 11 and 12 and for rotating the ratchet disc 18 relative to plates 11 and 12 by which the distance traveled per revolution of the wheel A is indicated and which in the present instance is two lineal feet—the periphery of the wheel tread being calibrated for this distance per revolution.

The ratchet disc 18 has formed on its peripheral rim a plurality of ratchet teeth 23a and a ratchet mechanism is provided which includes an arm 21 swingably connected with plate 12, a pawl member 22 which has an extension 22a extending substantially perpendicular to disc 18 so as to engage the teeth 23a of disc 18, and a spring 23 which is anchored between the pawl member 22 and plate 12 so as to urge the extension 22a to move into engagement with teeth 23a, pawl member 22 and arm 21 being pivotally joined together for movement relative to each other and the arrangement being such that the arm 21 and the pawl 22 are moved so as to advance the ratchet disc one tooth per each revolution of the measuring wheel. This is accomplished by means of a pin member 25 which is suitably fixed in a radial opening formed in the axle 16. The pin member 25 is so positioned with respect to axle 16 that the outer end thereof will contact a lip or extension 21a of the arm 21 each time the plates 11 and 12 make one complete revolution about the axis of axle 16. When the lip 21a moves into contact with the pin member 25, the arm 21 will be forced to move against the force of spring 23 a distance sufficient to rotate ratchet wheel 18 one tooth relative to plates 11 and 12. As the wheel A continues to rotate over the terrain to be measured the arm 21 swings past the pin 25, the spring 23 returning the arm 21 and the pawl 22 to starting position against projection 26 on plate 12. The return of the arm 21 causes it to strike projection 26 forcibly so that a sharp click is sounded indicating to the operator that the wheel has traversed two lineal feet. Another projection 27 on the plate 12 limits the travel of the arm 21 so that overriding of the pawl 22 in its engagement with the teeth of the ratchet disc 18 is prevented.

A washer 27a is fixed to the axle 16 adjacent the inner end of the bushing 17a, and fiber washers 27b are rotatably received by the bushing adjacent washer 27a. A spring 27c encircles the bushing and is compressed between the plate 11 and the fiber washers 27b for biasing washers 27b against washer 27a. The spring turns with the plate 11 which in turn causes the fiber washer 27b adjacent washer 27a to turn against washer 27a effecting thereby a friction drag against the free rotation of plates 11 and 12.

Now, in addition to the audible signal as effected by the single revolution of the wheel a second audible signaling means is provided for linear distances traversed greater than the distance of a single revolution. The means accomplishing this improvement includes a bell 28 secured to the inner face of the wheel housing plate 11, and a spring actuated hammer 29 secured to the inner face of the wheel housing plate 12 adapted to strike the bell surface. A projection 30 is provided on the inner face of the ratchet disc 18 in a predetermined position, dependent upon the linear distance beyond the single revolution distance of the wheel desired to be measured, the projection 30 and the hammer 29 being so related in the present illustrative embodiment of the invention as to effect the bell signaling of distances of 100 feet traversed by the wheel. The hammer 29 comprises a spring portion 29a which is arcuate in shape, and the spring portions 29b and 29c which extend beyond the arcuate portion 29a. The portion 29b is secured to plate 12 as shown by numeral 31 while the portion 29c carrying the hammerhead 29d is shaped so as to present the hammerhead inwardly and in position to contact the rim surface of the bell 28. The respective hammer portions 29a, 29b, and 29c lie across the inner face of ratchet disc 18 and in close proximity thereto, the form and relation of these portions and the ratchet disc being such that upon rotation of the measuring wheel the projection 30 of the ratchet disc engages and energizes the tension of the arcuate spring portion 29a during its travel therewith. The period of engagement of the arcuate spring portion 29a with the ratchet disc projection 30 in this illustrative embodiment of the invention is arranged as aforesaid for a linear measurement distance of 100 feet, at which time the hammerhead 29d with its built up tension is released against the outer surface of the bell 28, effecting a highly audible ringing sound which is clearly distinguishable from the audible click like sound as occasioned by the single revolution of the wheel.

It should be noted that, as shown in Fig. 1, the window 20 in the wheel housing plate 12 shows the measurement figure of 98 which indicates the number of feet traversed by the wheel immediately prior to the release of the engagement between the arcuate spring portion 29a of the hammer 29 and the projection 30 on the ratchet disc 18, the next figure turning up in the window 20 being zero (0) at which figure the hammer 29 is released striking the bell 28 and indicating by signal that the distance of 100 feet has been traversed by the wheel.

While an audible signaling means has been illustrated and described in the present embodiment of the invention for linear measurements of 100 feet, we desire it to be understood that the principles of the means as provided may be employed to effect the signaling of any predetermined distance beyond the signaling of a single revolution distance of the wheel, by proportioning the ratchet disc 18 to the number of projections 30 carried by it and arranging the mechanism of the spring actuated hammer 29 so that it will be engaged and released by the projection or projections 30 and the hammerhead 29d will strike the surface of the bell 28 with built up spring tension at the predetermined distance for which the assembly is arranged.

Referring again to the wheel housing of the instrument as provided by the improvements of the invention, it will be clear that the plates 11 and 12 forming the sides of the housing are mounted in a resilient cylindrical casing 10 formed by the tire of the wheel. The tire may be made of rubber, neoprene or any other resilient materials. This arrangement of structure provides a housing for the internal functioning portions of the wheel which is capable of absorbing the shocks and vibrations encountered under service conditions in a highly efficient manner with the result that the life and dependability of a measuring instrument of the wheel type is greatly enhanced. Furthermore, due to the sealing of the housing plates 11 and 12 in joint formation against the side margins of the tire 10 the inner portions of the instrument, as mounted on the inner surfaces of the plates, are contained in a housing which is substantially entirely weatherproof, thereby protecting the inner functioning portions of the structure against attack by the elements, with the result that the integrity of the instrument is preserved for long and arduous duty.

Again, by grooving the tire 10, the measurement tape 15, as set in the bottom of the groove 14, is encased and protected against defacement or injury by the tire tread portions 10a and 10b which straddle the tape and extend well above it.

Furthermore, the mounting of the inner functioning elements of the wheel on the surfaces of the respective housing plates 11 and 12 and their demountable relation with the tire 10, in the manner of the invention, greatly simplifies the wheel assembly and provides means whereby the critical inner portions of the instrument are made readily accessible for adjustment as well as means by which the replacement of the wheel tire can be quickly effected.

The practical results arising out of the improvement of our invention give extended utility to a measuring wheel of the described character making it possible for the instrument to traverse terrains which are rough and uneven as well as smooth and under adverse weather conditions with the result that a greater number of man hours of use of the instrument is assured to the operator.

While we have shown and described a specific embodiment of our invention we do not limit ourselves to the exact details of construction set forth, and the invention embraces such changes, modifications and equivalents of the parts and their formation and arrangement as come within the purview of the appended claims.

We claim:

1. In a measuring wheel, a wheel unit having a housing including a cylindrical portion and a pair of disc-like plates between which the cylindrical portion is held, a bushing carried by one of said plates, a bearing rotatably supported by the other of said plates in axially aligned position with respect to said bushing, an axle rotatably received in said bushing and rotatably supported in said bearing a handle fixed to said axle by means of which the wheel unit may be rolled over a surface to be measured, the cylindrical portion of the unit providing the tread of the wheel and the tread being centrally recessed with an annular groove, said groove having a measuring tape set therein, the tape having graduations to indicate the distance traversed by the tread and the tread straddling the measurement tape, said unit having revolution counting and indicating means the measurement indicating characters of which are visible through a window in one of the plates of the unit housing, means in the wheel unit for making an audible signal indicating the distance traversed by the wheel during a single revolution thereof and means in the wheel unit for making an audible signal when the wheel unit has traversed a predetermined distance greater than the distance of a single revolution.

2. In a measuring wheel, a hollow wheel unit having means for effecting a sequence of audible signals when the wheel is rolled over a surface to be measured, said wheel unit including spaced-apart side plates, one of said plates having an axle rotatably secured thereto and the other of said plates rotatably supporting a bearing in which the axle is supported, comprising, a ratchet disc fixed to said bearing and rotatable with and relative to said wheel unit, a pawl on the unit by which the ratchet disc is rotated and a projection on the unit against which the pawl is forcibly struck for making an audible signal when the wheel unit has traversed one complete revolution, said unit having a spring actuated hammer and a bell, and the ratchet disc of said unit carrying a projection, said projection engaging the hammer spring and releasing the hammer forcibly against the bell for making an audible signal when the wheel unit has traversed a distance greater than the distance of a single revolution.

3. A measuring wheel comprising a resilient cylindrical member and two relatively flat plates between which said member is compressed, the peripheral face of said member providing the tread of the wheel and the tread having an annular recess in its face, said recess containing a tape with graduations calibrated to indicate the lineal distance traversed by the tread per each revolution of the wheel unit, one of said plates having an axle rotatably secured thereto on which said wheel is mounted to rotate and the other of said plates having a bearing in which the axle is supported, the axle having a handle fixed thereto by which the wheel may be rolled over a surface to be measured.

4. A measuring wheel comprising a wheel unit having a pair of spaced-apart side plates, a bushing carried by one of said plates, a bearing rotatably supported by the other of said plates, said bearing being in an axially aligned relationship to said bushing, an axle rotatably received in said bushing and rotatably supported in said bearing for movably supporting said wheel unit, a ratchet disc fixed with said bearing adjacent the inner face of said other of said plates for rotative movement with said plates and for relative rotative movement with respect to said plates, a pawl carried by one of the plates and engaged with said ratchet disc for turning the ratchet disc in unison with said plates, means in the path of travel of said pawl for causing said pawl to rotate said ratchet disc relative to said plates a predetermined distance upon a complete revolution by said wheel unit, a projection on said ratchet disc, a resilient hammer carried by one of said plates in the path of travel of said projection, a bell carried by one of said plates, said projection cocking and releasing said hammer upon said ratchet disc completing one complete revolution and said hammer striking said bell when so cocked and released for making an audible signal.

5. In a measuring wheel, a wheel unit including spaced-apart side plates, an axle secured to one of said plates, a bearing rotatably supported by the other of said plates and rotatably receiving said axle, said wheel unit having means for signalling the linear distance traversed during a single revolution thereof and means for signalling a longer distance than the distance of a single revolution, both of said means having a ratchet disc fixed to said bearing and rotatable relative to and with said plates, the first said means including a spring loaded pawl on one of said plates for turning the ratchet disc, a projection of said one of said plates against which the pawl is forcibly struck for making an audible signal, and the second said means including a projection on the face of said ratchet disc, a resilient hammer fixed to one of said plates and having an arcuate spring portion residing closely adjacent the face of the ratchet disc and in a position for contact with the second mentioned projection, a bell fixed within the wheel unit with its surface in line for contact with said hammer, said second mentioned projection engaging the hammer upon rotation of the ratchet disc, the relation of said second mentioned projection and the hammer being such that the tension of said hammer is augmented during engagement of the arcuate portion with said second mentioned projection whereby the bell is forcibly struck by the hammer for making an audible signal when the ratchet disc has moved relative to said plates one complete revolution.

References Cited in the file of this patent

UNITED STATES PATENTS

| | | |
|---|---|---|
| 175,797 | Way | Apr. 4, 1876 |
| 344,536 | McCaleb | June 29, 1886 |
| 452,127 | Davis | May 12, 1891 |
| 530,686 | Gray | Dec. 11, 1894 |
| 2,467,515 | Young | Apr. 19, 1949 |
| 2,557,481 | Staples et al. | June 19, 1951 |

FOREIGN PATENTS

| | | |
|---|---|---|
| 409,096 | Germany | Jan. 30, 1925 |

OTHER REFERENCES

"'Tape Measure' Rolls to Work," page 111, Popular Mechanics, April 1951.